(12) United States Patent
Ishida et al.

(10) Patent No.: US 12,256,158 B2
(45) Date of Patent: Mar. 18, 2025

(54) INSPECTION APPARATUS (71) Applicant: ANRITSU CORPORATION, Kanagawa (JP)

(72) Inventors: Masaru Ishida, Kanagawa (JP); Hiroki Nakajima, Kanagawa (JP); Mikio Shibukawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 172 days.

(21) Appl. No.: 18/155,310

(22) Filed: Jan. 17, 2023

(65) Prior Publication Data
US 2023/0247312 A1 Aug. 3, 2023

(30) Foreign Application Priority Data
Jan. 31, 2022 (JP) ................... 2022-012967

(51) Int. Cl.
*H04N 23/90* (2023.01)
*B65G 15/24* (2006.01)
*H04N 23/56* (2023.01)

(52) U.S. Cl.
CPC ............. *H04N 23/90* (2023.01); *H04N 23/56* (2023.01); *B65G 15/24* (2013.01)

(58) Field of Classification Search
CPC ........ H04N 23/90; H04N 23/56; B65G 15/24; G01N 21/8806; G01N 21/8851; G01N 2021/845
See application file for complete search history.

(56) References Cited

U.S. PATENT DOCUMENTS 6,373,520 B1* 4/2002 Cadieux, Jr. ....... G01N 21/8806
348/125
11,614,411 B2* 3/2023 Niedermeier ...... G02B 23/2461
356/237.1
(Continued)

FOREIGN PATENT DOCUMENTS

JP 2008-127029 A 6/2008
JP 2013-246106 A 12/2013
(Continued)

OTHER PUBLICATIONS

Monthly Food Factory Manager, The Japan Food Journal, Aug. 1, 2021, pp. 84-85 (including partial English translation).

*Primary Examiner* — Fernando Alcon
(74) *Attorney, Agent, or Firm* — McDonald Hopkins LLC (57) ABSTRACT

To provide an inspection apparatus capable of simultaneously picking up images of one side and the other side of an inspection item with an image pickup device. An inspection apparatus 1 includes a first conveyance unit 31 and a second conveyance unit 32 arranged with a predetermined gap G and inspects a workpiece W when the workpiece W passes over the predetermined gap G. The inspection apparatus 1 includes a first image pickup device 11 provided on one side with the predetermined gap G in a direction intersecting with a conveyance direction of the workpiece W, a second image pickup device 12 provided on the other side, a first light emission device 21 disposed at a position facing the first image pickup device 11, and a second light emission device 22 disposed at a position facing the second image pickup device 12.

9 Claims, 8 Drawing Sheets

(56) References Cited

U.S. PATENT DOCUMENTS

| | | | |
|---|---|---|---|
| 2007/0030669 A1* | 2/2007 | Van Soest | G01N 33/025 |
| | | | 362/138 |
| 2012/0327227 A1* | 12/2012 | Ikeda | G01N 21/958 |
| | | | 348/143 |
| 2015/0241341 A1* | 8/2015 | Ikeda | H04N 23/30 |
| | | | 378/57 |
| 2018/0195974 A1* | 7/2018 | Kress | H04N 7/181 |
| 2019/0283445 A1* | 9/2019 | Sones | B41J 11/0095 |
| 2020/0258246 A1* | 8/2020 | Ono | G06T 7/586 |
| 2021/0122131 A1* | 4/2021 | Chatry | B26D 7/18 |
| 2021/0372937 A1* | 12/2021 | Nishizawa | G03G 15/1615 |
| 2022/0327798 A1* | 10/2022 | Müller | G01B 11/0608 |
| 2023/0071685 A1* | 3/2023 | Anthenat | G01N 21/8851 |
| 2023/0288349 A1* | 9/2023 | Tsuchiya | G01N 21/33 |
| 2024/0288378 A1* | 8/2024 | Melandri | G01N 21/90 |

FOREIGN PATENT DOCUMENTS

| | | |
|---|---|---|
| JP | 2016-065782 A | 4/2016 |
| JP | 2018-004532 A | 1/2018 |
| JP | 2019-066274 A | 4/2019 |

\* cited by examiner

INSPECTION APPARATUS

TECHNICAL FIELD

The present invention relates to an inspection apparatus.

BACKGROUND ART

In the related art, as an inspection apparatus that inspects a workpiece by using an image pickup device, an inspection apparatus disclosed in Non-Patent Document 1 is known. The inspection apparatus disclosed in Non-Patent Document 1 picks up an image of a workpiece being conveyed by a camera provided above a conveyor that conveys the workpiece in an appearance inspection process, and performs determination of a defective product based on the picked-up image.

In addition, the inspection apparatus disclosed in Non-Patent Document 1 is provided with a reversing mechanism for turning over the workpiece after the appearance inspection.

RELATED ART DOCUMENT

Patent Document

[Non-Patent Document 1] "Monthly Food Factory Manager", The Japan Food Journal, Aug. 1, 2021, pp. 84-85

DISCLOSURE OF THE INVENTION

Problem that the Invention is to Solve

However, in the inspection apparatus disclosed in Non-Patent Document 1, the camera only picks up an image of the front side of the workpiece, and no consideration is given to pickup of an image of the back side of the workpiece. When the camera also picks up the image of the back side of the workpiece, the reversing mechanism for turning over the workpiece is essential.

As described above, when the reversing mechanism is provided, an installation space for the reversing mechanism is required, and the cost increases by providing the reversing mechanism.

The present invention has been made in consideration of the above-described circumstances, and an object of the present invention is to provide an inspection apparatus capable of picking up images of one side and the other side of an inspection item with an image pickup device without providing a reversing mechanism.

Means for Solving the Problem

According to a first aspect of the present invention, an inspection apparatus includes a first conveyance unit and a second conveyance unit arranged with a predetermined gap in a conveyance direction of an inspection item and inspects the inspection item when the inspection item passes over the predetermined gap. The inspection apparatus includes a first image pickup device that is provided on one side with the predetermined gap in an intersection direction that intersects with the conveyance direction of the inspection item and picks up an image of the inspection item from the one side, a second image pickup device that is provided on the other side with the predetermined gap in the intersection direction and picks up an image of the inspection item from the other side, a first light emission device that is disposed at a position facing the first image pickup device with the predetermined gap in the intersection direction and emits light to the inspection item from the other side, and a second light emission device that is disposed at a position facing the second image pickup device with the predetermined gap in the intersection direction, and emits light to the inspection item from the one side.

With this configuration, the inspection apparatus according to the first aspect of the present invention can pick up images of the inspection item from the one side and the other side with the first image pickup device and the second image pickup device in the gap between the first conveyance unit and the second conveyance unit. Thus, the inspection apparatus according to the present invention can pick up images of an inspection item from the one side and the other side with two image pickup devices without providing a reversing mechanism.

According to a second aspect of the present invention, in the inspection apparatus according to the first aspect of the present invention, when the first image pickup device is at an image pickup position at which the first light emission device is included in an image pickup range, the second image pickup device is at an image pickup position at which the second light emission device is included in an image pickup range, and each of the image pickup positions is set as a first image pickup position, and when the first image pickup device is at an image pickup position at which the first light emission device is not included in an image pickup range, the second image pickup device is at an image pickup position at which the second light emission device is not included in an image pickup range, and each of the image pickup positions is set as a second image pickup position, at least one of the first image pickup device and the second image pickup device is configured to be able to switch the image pickup position between the first image pickup position and the second image pickup position.

With this configuration, in the inspection apparatus according to the second aspect of the present invention, at least one of the first image pickup device and the second image pickup device is configured to be able to switch the image pickup position between the first image pickup position at which the light emission device is included in the image pickup range and the second image pickup position at which the light emission device is not included in the image pickup range. Thus, it is possible to change the background of the inspection item by switching the image pickup position.

According to a third aspect of the present invention, in the inspection apparatus according to the second aspect, the inspection apparatus has a configuration in which at least one of the first image pickup device and the second image pickup device switches the image pickup position by changing the inclination of the image pickup axis.

With this configuration, since the inspection apparatus according to the third aspect of the present invention switches the image pickup position by changing the inclination of the image pickup axis of at least one of the first image pickup device and the second image pickup device, it is possible to easily switch the image pickup position of at least one of the first image pickup device and the second image pickup device.

According to a fourth aspect of the present invention, in the inspection apparatus according to the second aspect, the inspection apparatus has a configuration in which at least one of the first image pickup device and the second image pickup device each includes an image pickup element in which pixels are arranged in a plurality of rows in the conveyance direction, and switches the image pickup position by changing the row of pixels enabled in the conveyance direction in the image pickup element.

With this configuration, in the inspection apparatus according to the fourth aspect of the present invention, since at least one of the first image pickup device and the second image pickup device switches the image pickup position by changing the row of pixels enabled in the conveyance direction of each image pickup element, it is possible to switch the image pickup position without physically changing the positions and the postures of the first image pickup device and the second image pickup device.

According to a fifth aspect of the present invention, in the inspection apparatus according to the fourth aspect, the inspection apparatus has a configuration in which each of the first image pickup device and the second image pickup device includes an area camera using a two-dimensional element in which pixels are arranged two-dimensionally on a light receiving surface of the image pickup element.

With this configuration, in the inspection apparatus according to the fifth aspect of the present invention, each of the first image pickup device and the second image pickup device includes an area camera using a two-dimensional element on a light receiving surface of the image pickup element. Thus, it is possible to obtain a line-like image in the width direction by designating a row of pixels in the image pickup element of the area camera.

According to a sixth aspect of the present invention, in the inspection apparatus according to the first aspect, the inspection apparatus has a configuration in which the first light emission device includes at least two light emission devices disposed to be spaced apart from each other in the conveyance direction with an image pickup axis of the second image pickup device interposed between the light emission devices, and the second light emission device includes at least two light emission devices disposed to be spaced apart from each other in the conveyance direction with an image pickup axis of the first image pickup device interposed between the light emission devices.

With this configuration, in the inspection apparatus according to the sixth aspect of the present invention, each of the first light emission device and the second light emission device includes at least two or more light emission devices. Thus, it is possible to improve a light emission effect and obtain a stable image.

According to a seventh aspect of the present invention, in the inspection apparatus according to the second aspect, the inspection apparatus has a configuration in which the first light emission device includes at least two light emission devices disposed to be spaced apart from each other in the conveyance direction with an image pickup axis of the second image pickup device interposed between the light emission devices, and the second light emission device includes at least two light emission devices disposed to be spaced apart from each other in the conveyance direction with an image pickup axis of the first image pickup device interposed between the light emission devices.

With this configuration, in the inspection apparatus according to the seventh aspect of the present invention, each of the first light emission device and the second light emission device includes at least two or more light emission devices. Thus, it is possible to improve a light emission effect and obtain a stable image.

According to a eighth aspect of the present invention, in the inspection apparatus according to the third aspect, the inspection apparatus has a configuration in which the first light emission device includes at least two light emission devices disposed to be spaced apart from each other in the conveyance direction with an image pickup axis of the second image pickup device interposed between the light emission devices, and the second light emission device includes at least two light emission devices disposed to be spaced apart from each other in the conveyance direction with an image pickup axis of the first image pickup device interposed between the light emission devices.

With this configuration, in the inspection apparatus according to the eighth aspect of the present invention, each of the first light emission device and the second light emission device includes at least two or more light emission devices. Thus, it is possible to improve a light emission effect and obtain a stable image.

According to an ninth aspect of the present invention, in the inspection apparatus according to the fourth aspect, the inspection apparatus has a configuration in which the first light emission device includes at least two light emission devices disposed to be spaced apart from each other in the conveyance direction with an image pickup axis of the second image pickup device interposed between the light emission devices, and the second light emission device includes at least two light emission devices disposed to be spaced apart from each other in the conveyance direction with an image pickup axis of the first image pickup device interposed between the light emission devices.

With this configuration, in the inspection apparatus according to the ninth aspect of the present invention, each of the first light emission device and the second light emission device includes at least two or more light emission devices. Thus, it is possible to improve a light emission effect and obtain a stable image.

According to a tenth aspect of the present invention, in the inspection apparatus according to the second aspect, the inspection apparatus has a configuration in which each of the first image pickup device and the second image pickup device includes a line camera using a one-dimensional element in which pixels are arranged one-dimensionally on a light receiving surface of the image pickup element.

With this configuration, in the inspection apparatus according to the tenth aspect of the present invention, the first image pickup device and the second image pickup device continuously pick up images of the surface of the workpiece W line by line as the workpiece W moves. Thus, the image for each line can be combined to generate a single image of each surface of the workpiece W.

Advantage of the Invention

According to the present invention, it is possible to provide an inspection apparatus capable of picking up images of one side and the other side of an inspection item with an image pickup device, without providing a reversing mechanism.

BRIEF DESCRIPTION OF THE DRAWINGS

FIGS. 3A and 3B are schematic side views illustrating workpiece inspection in the inspection apparatus according to the first embodiment of the present invention; FIG. 3A illustrates the case where the image pickup device is at the first image pickup position, and FIG. 3B illustrates the case where the image pickup device is at the second image pickup position.

BEST MODE FOR CARRYING OUT THE INVENTION

Hereinafter, embodiments of the present invention will be described with reference to the drawings.

First Embodiment

An inspection apparatus according to a first embodiment of the present invention will be described with reference to FIGS. 1 to 3B.

Figure 1:
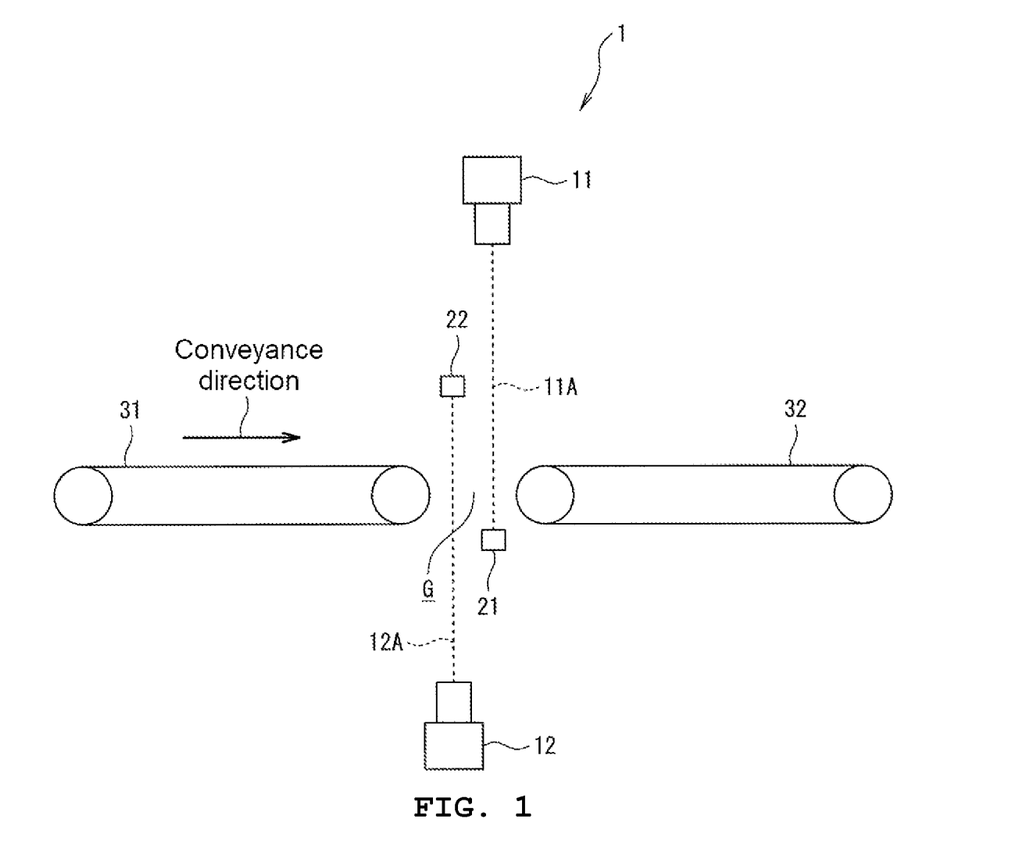
FIG. 1 is a schematic side view of an inspection apparatus according to a first embodiment of the present invention, and is a view illustrating a case where an image pickup device is at a first image pickup position.

As illustrated in FIG. 1, an inspection apparatus 1 in the present embodiment is an inspection apparatus that inspects, for example, the appearance of a workpiece W (see FIGS. 3A and 3B) as an inspection item by using an image pickup device. Examples of the workpiece W include packaged foods and unpackaged foods. When the workpiece W is unpackaged food or the like, the inspection apparatus 1 may be applied to foreign matter inspection for inspecting whether or not there is a foreign matter mixed in or adhered to the workpiece W.

Configuration of Inspection Apparatus

The inspection apparatus 1 is disposed between a first conveyance unit 31 and a second conveyance unit 32 arranged with a predetermined gap G in a conveyance direction of the workpiece W (indicated by an arrow in FIG. 1). The first conveyance unit 31 includes a belt conveyor and conveys the workpiece W to the second conveyance unit 32. The second conveyance unit 32 includes a belt conveyor, and conveys the workpiece W conveyed from the first conveyance unit 31 to a post-process. Here, the post-process includes, for example, an inspection process using an X-ray inspection apparatus. Also, the belt conveyor may be a transparent conveyor.

The inspection apparatus 1 inspects the appearance of the workpiece W when the workpiece W passes between the first conveyance unit 31 and the second conveyance unit 32, that is, over the predetermined gap G.

The inspection apparatus 1 is configured to include a first image pickup device 11, a second image pickup device 12, a first light emission device 21, and a second light emission device 22. In the following description, when the first image pickup device 11 and the second image pickup device 12 are not distinguished from each other, the first image pickup device 11 and the second image pickup device 12 may be collectively referred to as an "image pickup device" without reference signs. Further, when the first light emission device 21 and the second light emission device 22 are not distinguished from each other, the first light emission device 21 and the second light emission device 22 may be collectively referred to as a "light emission device" without reference signs.

The first image pickup device 11 is located on one side (in the present embodiment, on the upper side in FIG. 1) with a predetermined gap G in an intersection direction (in the present embodiment, vertical direction in FIG. 1) that intersects with the conveyance direction of the workpiece W. The first image pickup device 11 is held by a mounting bracket (not illustrated) at a position spaced apart from the predetermined gap G by a predetermined height.

The first image pickup device 11 includes a line camera using a one-dimensional element in which pixels are arranged one-dimensionally on a light receiving element surface as an image pickup element. The first image pickup device 11 picks up an image of a workpiece W from one side to obtain a line-like image in a width direction perpendicular to the conveyance direction of the workpiece W. The first image pickup device 11 continuously picks up images of the workpiece W being conveyed. The image for each line picked up by the first image pickup device 11 is configured as one image by being continuously captured to an image input board.

The second image pickup device 12 is provided on the other side (in the present embodiment, on the lower side in FIG. 1) with the predetermined gap G in the above-described intersection direction. The second image pickup device 12 is held by a mounting bracket (not illustrated) at a position spaced downward from the predetermined gap G by a predetermined distance.

Similar to the first image pickup device 11, the second image pickup device 12 includes a line camera, and picks up an image of the workpiece W from the other side to obtain a line-like image in the width direction. The second image pickup device 12 continuously picks up images of the workpiece W being conveyed. The image for each line picked up by the second image pickup device 12 is configured as one image by being continuously captured to an image input board.

In the present embodiment, the image pickup device is configured by a line camera, but the present embodiment is not limited to this, and may be configured by an area camera, for example. In this case, it is preferable to have a configuration of obtain a line-like image in the width direction in a pseudo manner similar to a line camera by designating a row of pixels (referred to as a "pixel row" below) in the image pickup element of the area camera.

The first light emission device 21 is disposed at a position facing the first image pickup device 11 with the predetermined gap G in the intersection direction described above. The first light emission device 21 has configuration of being elongated in the width direction described above, and has a length that is substantially equal to the length of the first conveyance unit 31 and the second conveyance unit 32 in the width direction, for example. The first light emission device 21 is held by a mounting bracket (not illustrated) at a position spaced downward from the predetermined gap G and closer to the predetermined gap G than the second image pickup device 12.

The first light emission device 21 includes, for example, a light source such as a halogen lamp or an LED, and emits s light to the workpiece W passing over the predetermined gap G from the other side described above.

The second light emission device 22 is disposed at a position facing the second image pickup device 12 with the predetermined gap G in the intersection direction described above. The second light emission device 22 has a configuration of being elongated in the width direction described above, and has a length that is substantially equal to the length of the first conveyance unit 31 and the second conveyance unit 32 in the width direction, for example. The second light emission device 22 is held by a mounting bracket (not illustrated) at a position spaced upward from the predetermined gap G and closer to the predetermined gap G than the first image pickup device 11.

The second light emission device 22 includes, for example, a light source such as a halogen lamp or an LED, and emits light to the workpiece W passing over the predetermined gap G from the one side described above.

Image Pickup Position Switching of Image Pickup Device

In the present embodiment, each of the first image pickup device 11 and the second image pickup device 12 is configured to be able to switch an image pickup position.

For example, when the light receiving element surface of the image pickup element of the image pickup device is set to face the light emission device disposed at the position facing the image pickup device in the intersection direction with the predetermined gap G, the emission light of the light emission device enters the image pickup device. In this state, when the image of the workpiece W passing over the predetermined gap G is picked up by the image pickup device, the background color of the workpiece W in the image obtained by picking up the workpiece W has the same color as the emission light.

Depending on the type of workpiece W being an inspection target, it may be desirable to set the background color of the workpiece W to, for example, black or a color close to black rather than the same color as the emission light in order to make the image stand out, and image processing may be easily performed.

Therefore, in the present embodiment, as described above, by switching the image pickup position of the image pickup device, it is possible to switch the background color of the workpiece W in the image obtained by the image pickup of the image pickup device.

Figure 2:
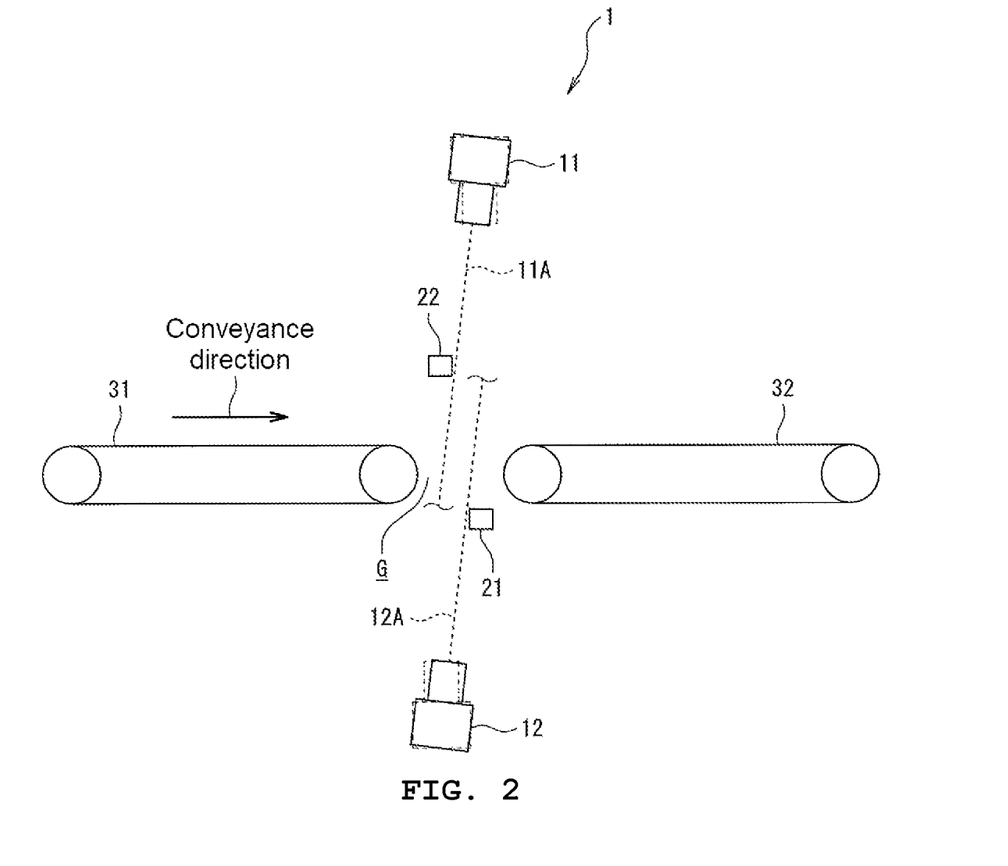
FIG. 2 is a schematic side view of the inspection apparatus according to the first embodiment of the present invention, and is a view illustrating a case where the image pickup device is at a second image pickup position.

Specifically, the first image pickup device 11 is configured to be able to switch the image pickup position between a first image pickup position (position illustrated in FIG. 1) and a second image pickup position (position illustrated in FIG. 2). At the first image pickup position, the first light emission device 21 is included in an image pickup range. At the second image pickup position, the first light emission device 21 is not included in the image pickup range. The second image pickup device 12 is configured to be able to switch the image pickup position between a first image pickup position (position illustrated in FIG. 1) and a second image pickup position (position illustrated in FIG. 2). At the first image pickup position, the second light emission device 22 is included in an image pickup range. At the second image pickup position, the second light emission device 22 is not included in the image pickup range.

Broken lines in FIGS. 1 and 2 indicate the respective image pickup axes 11A and 12A of the first image pickup device 11 and the second image pickup device 12. The image pickup axes 11A and 12A are axes passing through the centers of the light receiving element surfaces of the image pickup elements of the first image pickup device 11 and the second image pickup device 12, respectively.

As illustrated in FIG. 2, the first image pickup device 11 and the second image pickup device 12 switch the image pickup position by changing the inclination of the image pickup axes 11A and 12A. For example, by adjusting attachment angles of the first image pickup device 11 and the second image pickup device 12 to the mounting brackets, the inclination of the image pickup axes 11A and 12A is changed.

Here, at the second image pickup position (position illustrated in FIG. 2), the inclination of the image pickup axis 11A is adjusted such that the first image pickup device 11 is at a position at which the first light emission device 21 is not included in the image pickup range and the second light emission device 22 is not included in the image pickup range.

In the present embodiment, the first image pickup device 11 is adjusted such that the image pickup axis 11A is tilted to the upstream side in the conveyance direction at the second image pickup position. If the first light emission device 21 and the second light emission device 22 are not included in the image pickup range, the image pickup axis 11A may be adjusted to be tilted to the downstream side in the conveyance direction.

In addition, at the second image pickup position (position illustrated in FIG. 2), the inclination of the image pickup axis 12A is adjusted such that the second image pickup device 12 is at a position at which the second light emission device 22 is not included in the image pickup range and the first light emission device 21 is not included in the image pickup range.

In the present embodiment, the second image pickup device 12 is adjusted such that the image pickup axis 12A is tilted to the downstream side in the conveyance direction at the second image pickup position. If the first light emission device 21 and the second light emission device 22 are not included in the image pickup range, the image pickup axis 12A may be adjusted to be tilted to the upstream side in the conveyance direction.

Work of Inspection Apparatus

Next, work of the inspection apparatus 1 in the present embodiment will be described with reference to FIGS. 3A and 3B.

Figure 3A:
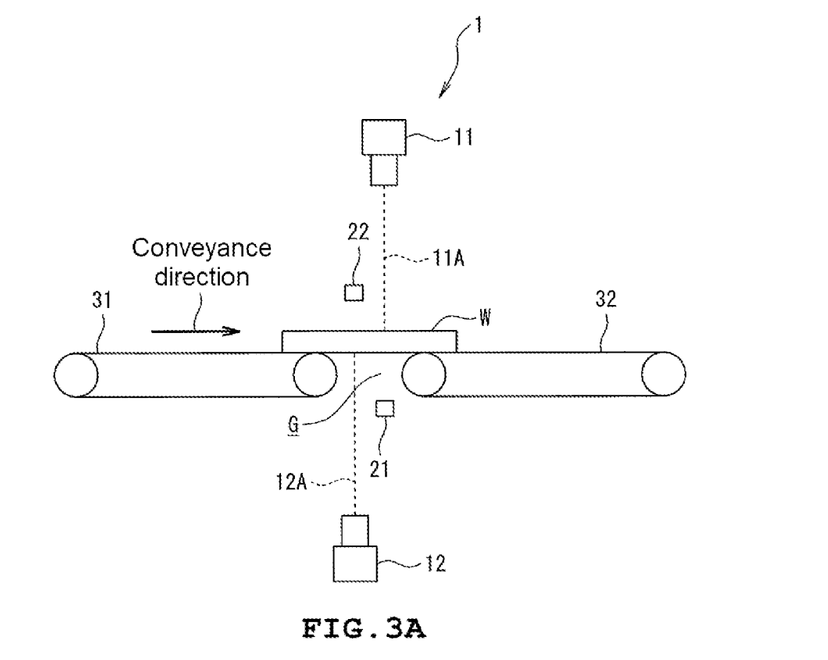
Figure 3B:
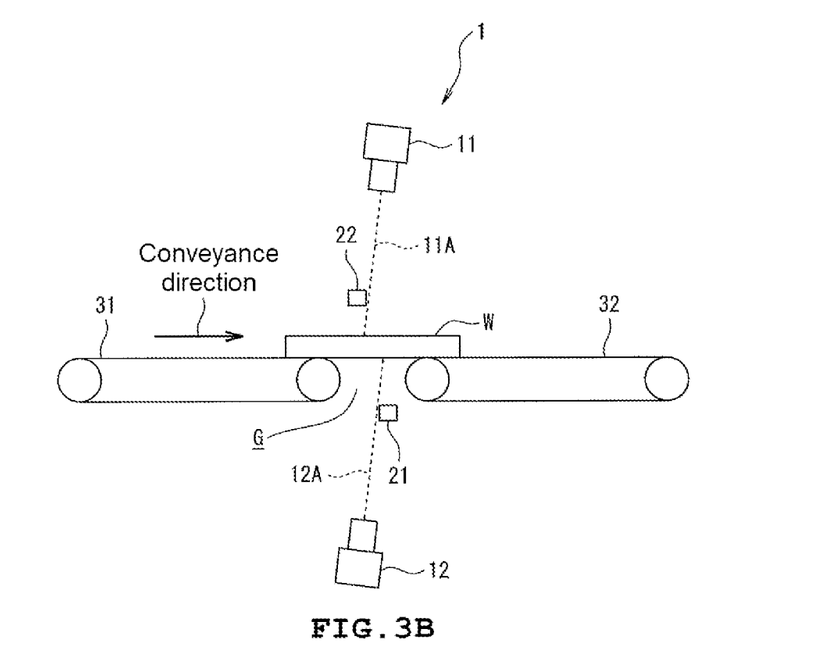

As illustrated in FIGS. 3A and 3B, when the image pickup device is at the first image pickup position or the second image pickup position, and the workpiece W passes over the predetermined gap G, light is emitted to the workpiece W from the one side (in the present embodiment, the upper side in FIGS. 3A and 3B) by the second light emission device 22, and light is emitted to the workpiece W from the other side (in the present embodiment, the lower side in FIGS. 3A and 3B) by the first light emission device 21.

At this time, the first image pickup device 11 continuously picks up images of the upper surface of the workpiece W line by line as the workpiece W moves. Specifically, the first image pickup device 11 converts the reflected light from the upper surface of the workpiece W into a digital image for each line with the image pickup element, and transmits the converted image data to the image input board (not illustrated). The digital image for each line transmitted to the image input board is combined to generate a single image.

The second image pickup device 12 continuously picks up images of the lower surface of the workpiece W line by line as the workpiece W moves. Specifically, the second image pickup device 12 converts the reflected light from the lower surface of the workpiece W into a digital image for each line with the image pickup element, and transmits the converted image data to the image input board (not illustrated). The digital image for each line transmitted to the image input board is combined to generate a single image.

As described above, in the present embodiment, when the workpiece W passes over the predetermined gap G, the first image pickup device 11 and the second image pickup device 12 simultaneously pick up images of the upper surface side and the lower surface side of the workpiece W.

At this time, as illustrated in FIG. 3A, when the first image pickup device 11 is at the first image pickup position, in addition to the reflected light from the upper surface of the workpiece W, the emission light from the first light emission device 21, which is not blocked by the workpiece W is entered into the first image pickup device 11. As a result, the image obtained by the first image pickup device 11 is an image in which the background color of the workpiece W is the same color as the emission light from the first light emission device 21.

Further, when the second image pickup device 12 is at the first image pickup position, in addition to the reflected light from the lower surface of the workpiece W, the emission light from the second light emission device 22, which is not blocked by the workpiece W, is entered into the second image pickup device 12. As a result, the image obtained by the second image pickup device 12 is an image in which the background color of the workpiece W is the same color as the emission light from the second light emission device 22.

On the other hand, as illustrated in FIG. 3B, when the first image pickup device 11 is at the second image pickup position, the reflected light from the upper surface of the workpiece W is mainly entered into the first image pickup device 11, and the emission light from the first light emission device 21, which is not blocked by the workpiece W, is not entered into the first image pickup device 11 or only slightly entered. As a result, the image obtained by the first image pickup device 11 is an image in which the background color of the workpiece W is black or close to black.

When the second image pickup device 12 is at the second image pickup position, the reflected light from the lower surface of the workpiece W is mainly entered into the second image pickup device 12, and the emission light from the second light emission device 22, which is not blocked by the workpiece W, is not entered into the second image pickup device 12 or only slightly entered. As a result, the image obtained by the second image pickup device 12 is an image in which the background color of the workpiece W is black or close to black.

Actions and Effects

As described above, the inspection apparatus according to the present embodiment can simultaneously pick up images of the workpiece W from the upper surface side and the lower surface side with the first image pickup device 11 and the second image pickup device 12 in the predetermined gap G between the first conveyance unit 31 and the second conveyance unit 32. As a result, the inspection apparatus according to the present embodiment can pick up images of the upper surface side and the lower surface side of the workpiece W with two image pickup devices, without providing a reversing mechanism.

Further, in the inspection apparatus according to the present embodiment, both the first image pickup device 11 and the second image pickup device 12 are configured to be able to switch the image pickup position between the first image pickup position (the position illustrated in FIG. 1) at which the light emission device is included in the image pickup range, and the second image pickup position (the position illustrated in FIG. 2) at which the light emission device is not included in the image pickup range. Thus, it is possible to change the background of the workpiece W by switching the image pickup position.

In addition, the inspection apparatus according to the present embodiment switches the image pickup position by changing the inclination of the image pickup axes 11A and 12A of the first image pickup device 11 and the second image pickup device 12. Thus, it is possible to easily switch the image pickup positions of the first image pickup device 11 and the second image pickup device 12 including the line camera.

Modification Example of First Embodiment

Figure 4:
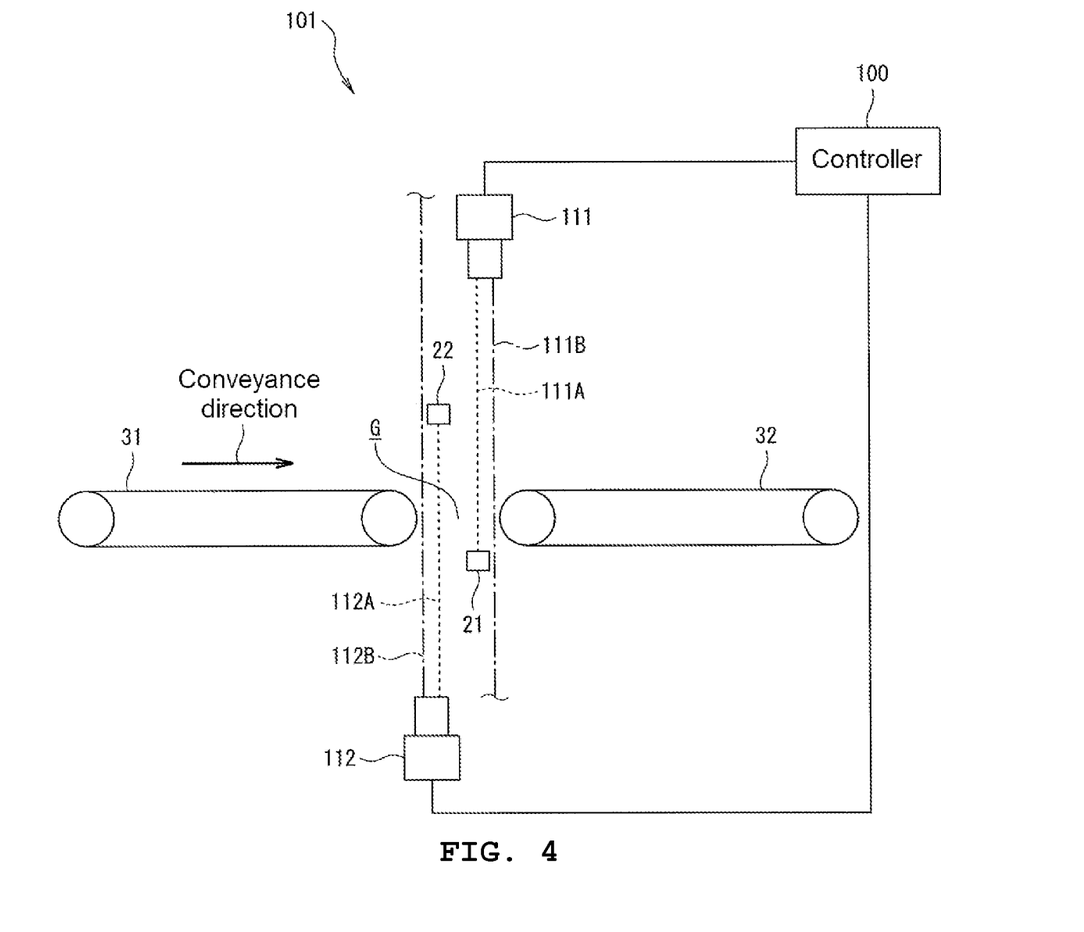
FIG. 4 is a schematic side view illustrating a modification example of the inspection apparatus according to the first embodiment of the present invention.

The inspection apparatus according to the first embodiment may have a configuration as illustrated in FIG. 4 as the configuration of switching the image pickup position of the image pickup device.

Specifically, as illustrated in FIG. 4, an inspection apparatus 101 according to the modification example includes a first image pickup device 111 and a second image pickup device 112 including an area camera that uses a two-dimensional element in which pixels are arranged two-dimensionally on a light receiving element surface as an image pickup element.

The first image pickup device 111 and the second image pickup device 112 are connected to a controller 100 including an image input board.

Figure 5:
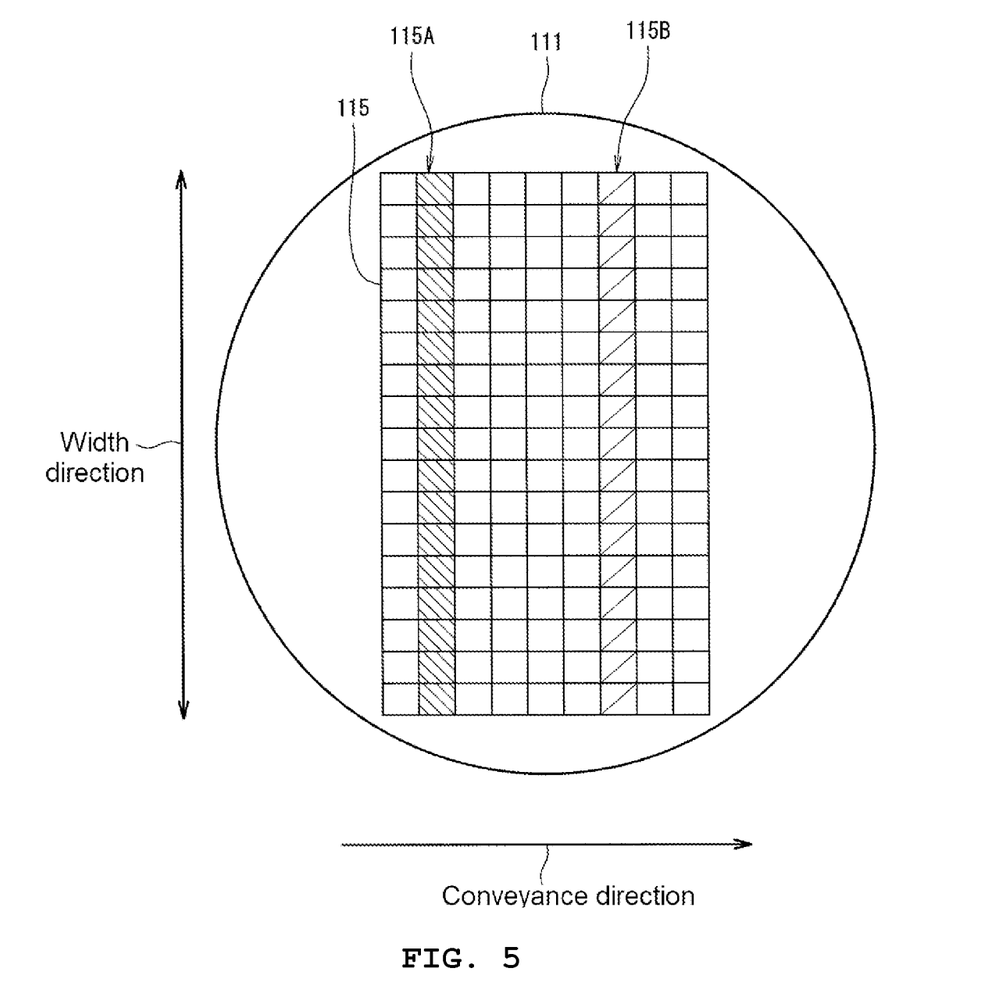
FIG. 5 is an enlarged view of an image pickup element of a first image pickup device in the modification example of the inspection apparatus according to the first embodiment of the present invention.

The configurations of the image pickup elements of the first image pickup device 111 and the second image pickup device 112 will be described with reference to FIG. 5, by using an image pickup element 115 of the first image pickup device 111 as an example. The image pickup element of the second image pickup device 112 has the same configuration as the image pickup element 115 of the first image pickup device 111, so the description thereof is omitted. FIG. 5 is an enlarged view when the image pickup element 115 of the first image pickup device 111 is viewed from the other side, that is, from the lower side.

As illustrated in FIG. 5, the image pickup element 115 is configured by arranging pixels in a plurality of rows in the conveyance direction and the width direction. FIG. 5 illustrates pixels of which the number is reduced for convenience of explanation. In the present modification example, the first image pickup device 111 switches the image pickup position by changing the pixel row enabled in the conveyance direction. The controller 100 changes the pixel row.

For example, at the first image pickup position at which the first light emission device 21 is included in the image pickup range of the first image pickup device 111, a pixel row 115A located on the upstream side in the conveyance direction is enabled or designated to perform image pickup. As a result, the first image pickup device 111 can overlap the image pickup axis 111A (indicated by the broken line in FIG. 4) of the pixel row 115A with the first light emission device 21 in the vertical direction. As a result, at the first image pickup position, the first light emission device 21 is included in the image pickup range. The image pickup axis 111A is an axis passing through the center of the light receiving element surface forming the pixel row 115A.

On the other hand, at the second image pickup position at which the first light emission device 21 is not included in the image pickup range, a pixel row 115B located on the downstream side in the conveyance direction is enabled or designated to perform image pickup. Thus, the first image pickup device 111 can prevent overlapping between the image pickup axis 111B (indicated by the dashed line in FIG. 4) of the pixel row 115B and the first light emission device 21 in the vertical direction. As a result, at the second image pickup position, the first light emission device 21 is not included in the image pickup range. The image pickup axis 111B is an axis passing through the center of the light receiving element surface forming the pixel row 115B.

As described above, according to the inspection apparatus 101 according to the present modification example, the first image pickup device 111 and the second image pickup device 112 switch the image pickup positions by changing the pixel row enabled in the conveyance direction in each image pickup element. Thus, it is possible to switch the image pickup position without physically changing the positions and the postures of the first image pickup device 111 and the second image pickup device 112.

Second Embodiment

Next, a second embodiment of the present invention will be described with reference to FIGS. 6 and 7.

An inspection apparatus 201 according to the present embodiment differs from the inspection apparatus 1 according to the first embodiment in the configuration of the light emission device, and other configurations are the same as those of the first embodiment. Therefore, in the following description, the same components as those in the first embodiment are denoted by the same reference sign as that in the first embodiment, and the description thereof will be omitted.

Figure 6:
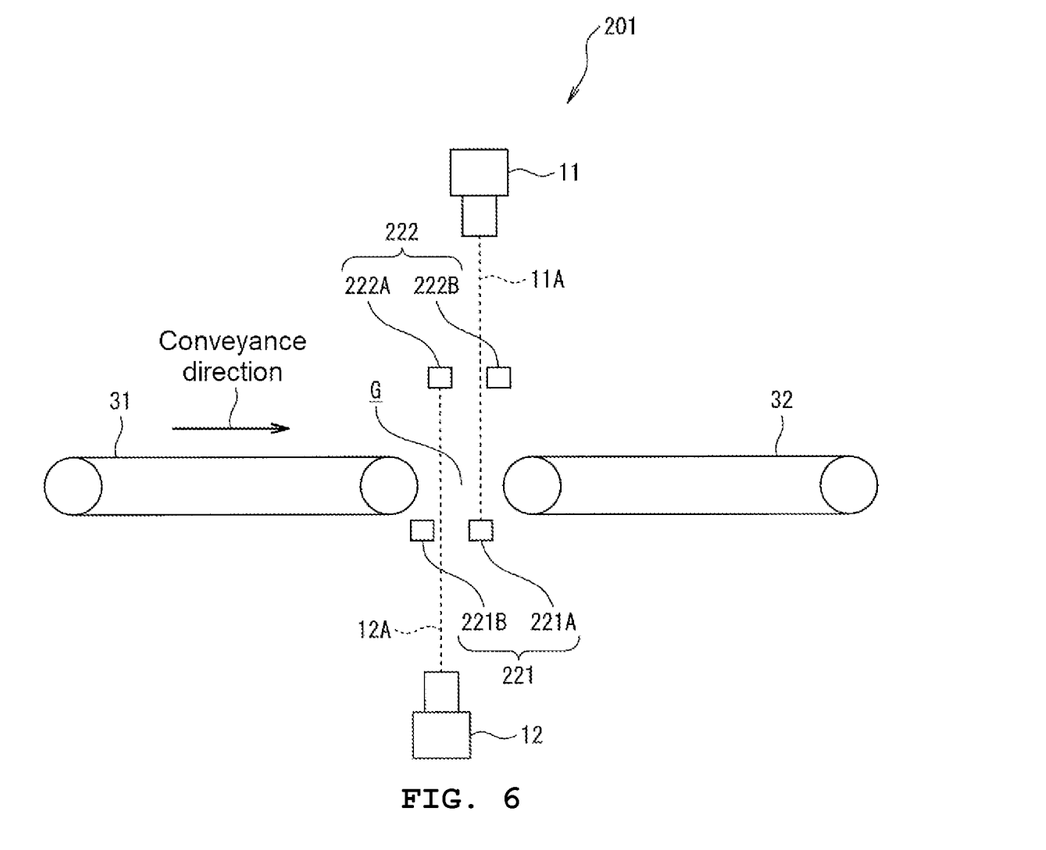
FIG. 6 is a schematic side view of an inspection apparatus according to a second embodiment of the present invention, and is a view illustrating a case where an image pickup device is at a first image pickup position.

As illustrated in FIG. 6, in the inspection apparatus 201 in the present embodiment, a first light emission device 221 includes two light emission devices 221A and 221B. The light emission devices 221A and 221B include, for example, a light source such as a halogen lamp or an LED, and emits light to the workpiece W passing over the predetermined gap G from the other side described above. The number of light emission devices forming the first light emission device 221 is not limited to two.

The light emission devices 221A and 221B have a configuration of being elongated in the width direction described above, and have a length that is substantially equal to the length of the first conveyance unit 31 and the second conveyance unit 32 in the width direction, for example.

The light emission devices 221A and 221B are disposed to be spaced apart from each other in the conveyance direction with the image pickup axis 12A of the second image pickup device 12 interposed therebetween. The light emission device 221A is disposed at a position that vertically overlaps the image pickup axis 11A when the first image pickup device 11 is at the first image pickup position (position illustrated in FIG. 6). The light emission device 221B is disposed on the upstream side of the light emission device 221A in the conveyance direction and on the upstream side of the image pickup axis 12A of the second image pickup device 12 in the conveyance direction.

The second light emission device 222 in the present embodiment includes two light emission devices 222A and 222B. The light emission devices 222A and 222B include, for example, a light source such as a halogen lamp or an LED, and emits light to the workpiece W passing over the predetermined gap G from the one side described above. The number of light emission devices forming the second light emission device 222 is not limited to two.

The light emission devices 222A and 222B have a configuration of being elongated in the width direction described above, and have a length that is substantially equal to the length of the first conveyance unit 31 and the second conveyance unit 32 in the width direction, for example.

The light emission devices 222A and 222B are disposed to be spaced apart from each other in the conveyance direction with the image pickup axis 11A of the first image pickup device 11 interposed therebetween. The light emission device 222A is disposed at a position that vertically overlaps the image pickup axis 12A when the second image pickup device 12 is at the first image pickup position (position illustrated in FIG. 6). The light emission device 222B is disposed on the downstream side of the light emission device 222A in the conveyance direction and on the downstream side of the image pickup axis 11A of the first image pickup device 11 in the conveyance direction.

Figure 7:
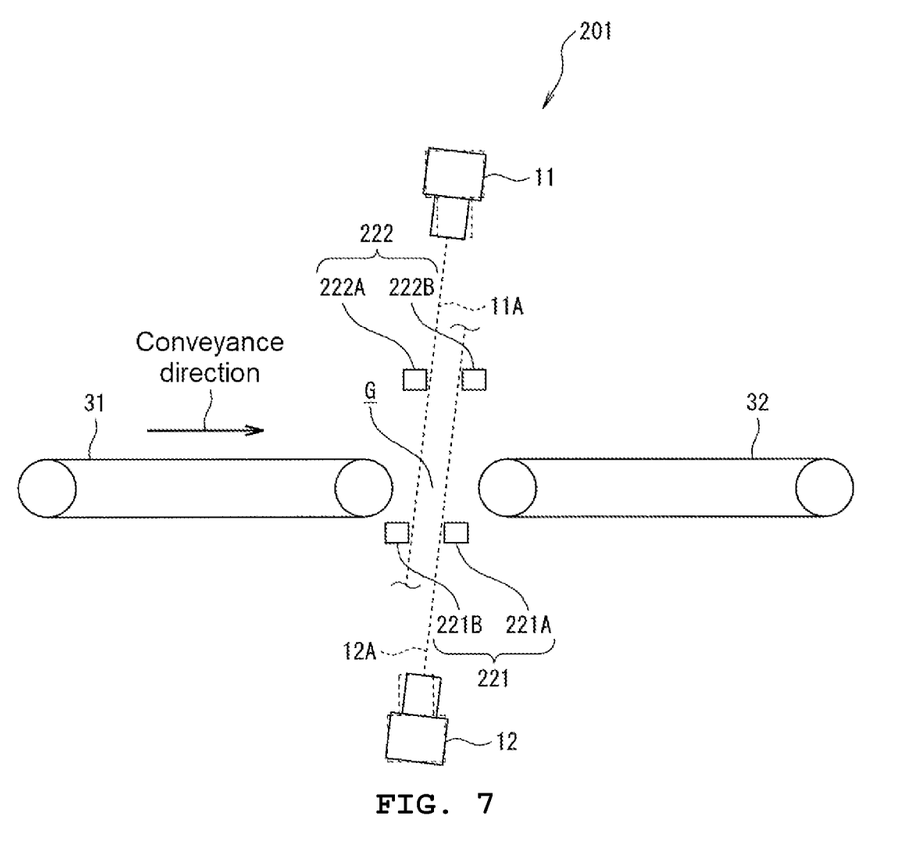
FIG. 7 is a schematic side view of the inspection apparatus according to the second embodiment of the present invention, and is a view illustrating a case where the image pickup device is at a second image pickup position.

As illustrated in FIG. 7, the light emission device 221A and the light emission device 221B are disposed at positions that do not interfere with the image pickup axis 11A and the image pickup axis 12A when the image pickup device is at the second image pickup position.

This prevents the light emission device 221A from overlapping the image pickup range of the second image pickup device 12 when the image pickup device is at the second image pickup position, and also prevents the light emission device 221B from entering the image pickup range of the first image pickup device 11.

In this case, since the light emission device 221B does not enter the image pickup range of the first image pickup device 11, when the image pickup device is at the second image pickup position, the emission light of the light emission device 221B can be prevented from being entered into the first image pickup device 11 or can be slightly entered into the first image pickup device 11.

The light emission device 222A and the light emission device 222B are disposed at positions that do not interfere with the image pickup axis 11A and the image pickup axis 12A when the image pickup device is at the second image pickup position.

This prevents the light emission device 222A from overlapping the image pickup range of the first image pickup device 11 when the image pickup device is at the second image pickup position, and also prevents the light emission device 222B from entering the image pickup range of the second image pickup device 12.

In this case, since the light emission device 222B does not enter the image pickup range of the second image pickup device 12, when the image pickup device is at the second image pickup position, the emission light of the light emission device 222B can be prevented from being entered into the second image pickup device 12 or can be slightly entered into the second image pickup device 12.

Actions and Effects

As described above, the inspection apparatus according to the present embodiment has the following actions and effects in addition to the actions and effects of the first embodiment described above.

That is, in the inspection apparatus according to the present embodiment, each of the first light emission device 221 and the second light emission device 22 includes two light emission devices, so that it is possible to improve the light emission effect and obtain a stable image.

First Modification Example of Second Embodiment

Figure 8:
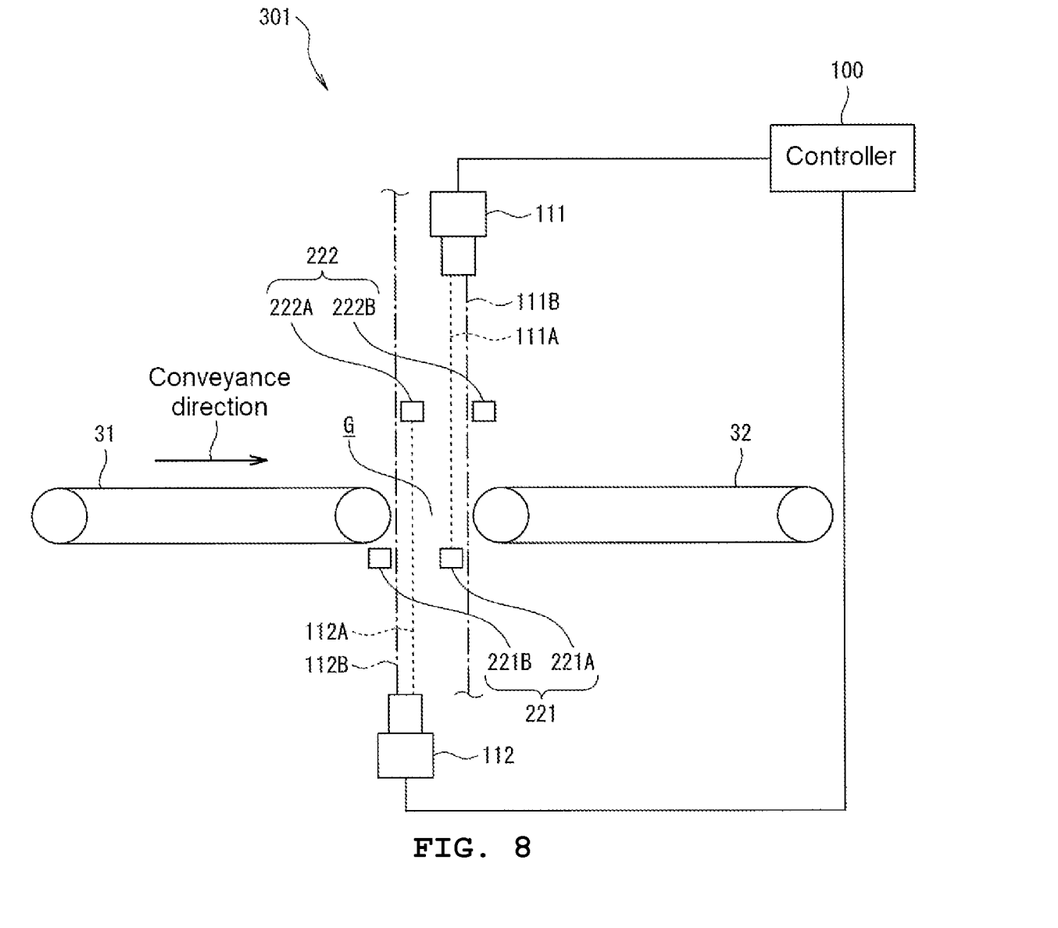
FIG. 8 is a schematic side view illustrating a first modification example of the inspection apparatus according to the second embodiment of the present invention.

The inspection apparatus according to the second embodiment may have a configuration as illustrated in FIG. 8 as the configuration of switching the image pickup position of the image pickup device.

Specifically, as illustrated in FIG. 8, an inspection apparatus 301 according to the first modification example differs from the inspection apparatus 101 (see FIG. 4) according to the modification example of the first embodiment in the number of light emission devices, and other configurations are the same as those of the inspection apparatus 101.

As illustrated in FIG. 8, in the inspection apparatus 301, the light emission device 221A and the light emission device 221B are disposed to be spaced apart from each other in the conveyance direction with the image pickup axes 112A and 112B of the second image pickup device 112 interposed therebetween.

The light emission device 221A is disposed at a position that vertically overlaps the image pickup axis 111A when the first image pickup device 111 is at the first image pickup position, that is, when the pixel row having the image pickup axis 111A is selected. The light emission device 221B is disposed on the upstream side of the light emission device 221A in the conveyance direction and on the upstream side of the image pickup axis 112A of the second image pickup device 112 in the conveyance direction.

In the inspection apparatus 301, the light emission device 222A and the light emission device 222B are disposed to be spaced apart from each other in the conveyance direction with the image pickup axes 111A and 111B of the first image pickup device 111 interposed therebetween.

The light emission device 222A is disposed at a position that vertically overlaps the image pickup axis 112A when the second image pickup device 112 is at the first image pickup position, that is, when the pixel row having the image pickup axis 112A is selected. The light emission device 222B is disposed on the downstream side of the light emission device 222A in the conveyance direction and on the downstream side of the image pickup axis 111A of the first image pickup device 111 in the conveyance direction.

When the image pickup device is at the second image pickup position, that is, when the pixel row having the image pickup axis 111B and the pixel row having the image pickup axis 112B are selected, the light emission device 221A and the light emission device 221B are disposed at positions that do not interfere with the image pickup axis 111B and the image pickup axis 112B.

This prevents the light emission device 221B from overlapping the image pickup range of the second image pickup device 112 when the image pickup device is at the second image pickup position, and also prevents the light emission device 221A from entering the image pickup range of the first image pickup device 111.

In this case, since the light emission device 221A does not enter the image pickup range of the first image pickup device 111, when the image pickup device is at the second image pickup position, the emission light of the light emission device 221A can be prevented from being entered into the first image pickup device 111 or can be slightly entered into the first image pickup device 111.

The light emission device 222A and the light emission device 222B are disposed at positions that do not interfere with the image pickup axis 111B and the image pickup axis 112B when the image pickup device is at the second image pickup position.

This prevents the light emission device 222B from overlapping the image pickup range of the first image pickup device 111 when the image pickup device is at the second image pickup position, and also prevents the light emission device 222A from entering the image pickup range of the second image pickup device 112.

In this case, since the light emission device 222A does not enter the image pickup range of the second image pickup device 112, when the image pickup device is at the second image pickup position, the emission light of the light emission device 222A can be prevented from being entered into the second image pickup device 112 or can be slightly entered into the second image pickup device 112.

Second Modification Example of Second Embodiment

The second embodiment is configured to switch the image pickup position by adjusting the inclination of the image pickup axis of the image pickup device. The present embodiment is not limited to this. For example, the present embodiment may be configured to switch the image pickup position by fixing the position of the image pickup device to the position as illustrated in FIG. 6 and controlling lighting and extinguishing of the light emission device 221A and the light emission device 222A.

In this case, the case where the light emission devices 221A and 222A are lit is defined as a first image pickup position, and the case where the light emission devices 221A and 222A are extinguished is defined as a second image pickup position.

Modification Example Common to Embodiments

In each of the above-described embodiments, the example in which the inspection apparatus according to the present invention is applied to an inspection apparatus that inspects the workpiece W passing over the predetermined gap G between the first conveyance unit 31 and the second conveyance unit 32 arranged horizontally. The present embodiment is not limited to this. For example, the inspection apparatus according to the present invention is applied to an inspection apparatus as follows.

For example, the inspection apparatus according to the present invention can be applied to an inspection apparatus that inspects a workpiece W that is dropped and conveyed between the conveyance unit on the upstream side in the conveyance direction and the conveyance unit on the downstream side in the conveyance direction, separated in the vertical direction by a predetermined gap.

Further, in each of the above-described embodiments, although the light emission device having a configuration of directly emitting light to the workpiece W is adopted as the light emission device, the present embodiment is not limited to this. For example, a light emission device that emits light to the workpiece W via a reflector may be adopted.

Further, in each of the above-described embodiments, the light source of the light emission device is not limited to visible light, and any wavelength that can be used in image pickup of the image pickup device may be used.

Further, in each of the above-described embodiments, the position of the light emission device is fixed, but the light emission device may be configured to be movable in the conveyance direction. In this case, for example, it is possible to switch the image pickup position by fixing the position of the image pickup device and moving the light emission device in the conveyance direction.

Further, in each of the above-described embodiments, both the first image pickup device and the second image pickup device are configured to be able to switch the image pickup position, but the present invention is not limited to this. At least one of the first image pickup device and the second image pickup device may be configured such that the image pickup position can be switched.

Hitherto, the embodiments of the present invention have been disclosed, but it is clear that changes can be made by those skilled in the art without departing from the scope of the present invention. All such modifications and equivalents are intended to be included in the claims as follows.

DESCRIPTION OF REFERENCE NUMERALS AND SIGNS 1, 101, 201, 301: Inspection apparatus
11, 111: First image pickup device 11A, 111A, 111B: Image pickup axis
12, 112: Second image pickup device
12A, 112A, 112B: Image pickup axis
21, 221: First light emission device
22, 222: Second light emission device
31: First conveyance unit
32: Second conveyance unit
100: Controller
115: Image pickup element
115A, 115B: Pixel row
221A, 221B, 222A, 222B: Light emission device
W: Workpiece (Inspection item)
G: Predetermined gap

What is claimed is:

1. An inspection apparatus that includes a first conveyance unit and a second conveyance unit arranged with a predetermined gap in a conveyance direction of an inspection item and inspects the inspection item when the inspection item passes over the predetermined gap, the inspection apparatus comprising:
a first image pickup device that is provided on one side with the predetermined gap in an intersection direction that intersects with the conveyance direction of the inspection item and picks up an image of the inspection item from the one side;
a second image pickup device that is provided on the other side with the predetermined gap in the intersection direction and picks up an image of the inspection item from the other side;
a first light emission device that is disposed at a position facing the first image pickup device with the predetermined gap in the intersection direction and emits light to the inspection item from the other side; and
a second light emission device that is disposed at a position facing the second image pickup device with the predetermined gap in the intersection direction and emits light to the inspection item from the one side,
wherein
when the first image pickup device is at an image pickup position at which the first light emission device is included in an image pickup range, the second image pickup device is at an image pickup position at which the second light emission device is included in an image pickup range, and each of the image pickup positions is set as a first image pickup position, and
when the first image pickup device is at an image pickup position at which the first light emission device is not included in the image pickup range, the second image pickup device is at an image pickup position at which the second light emission device is not included in the image pickup range, and each of the image pickup positions is set as a second image pickup position,
at least one of the first image pickup device and the second image pickup device is configured switch the image pickup position between the first image pickup position and the second image pickup position.

2. The inspection apparatus according to claim 1, wherein at least one of the first image pickup device and the second image pickup device switches the image pickup position by changing an inclination of an image pickup axis.

3. The inspection apparatus according to claim 1, wherein each of at least one of the first image pickup device and the second image pickup device includes an image pickup element in which pixels are arranged in a plurality of rows in the conveyance direction, and switches the image pickup position by changing the row of pixels enabled in the conveyance direction in the image pickup element.

4. The inspection apparatus according to claim 3, wherein each of the first image pickup device and the second image pickup device includes an area camera using a two-dimensional element in which pixels are arranged two-dimensionally on a light receiving surface of the image pickup element.

5. An inspection apparatus that includes a first conveyance unit and a second conveyance unit arranged with a predetermined gap in a conveyance direction of an inspection item and inspects the inspection item when the inspection item passes over the predetermined gap, the inspection apparatus comprising:
a first image pickup device that is provided on one side with the predetermined gap in an intersection direction that intersects with the conveyance direction of the inspection item and picks up an image of the inspection item from the one side;
a second image pickup device that is provided on the other side with the predetermined gap in the intersection direction and picks up an image of the inspection item from the other side;
a first light emission device that is disposed at a position facing the first image pickup device with the predetermined gap in the intersection direction and emits light to the inspection item from the other side; and
a second light emission device that is disposed at a position facing the second image pickup device with the predetermined gap in the intersection direction and emits light to the inspection item from the one side,
wherein
the first light emission device includes at least two light emission devices disposed to be spaced apart from each other in the conveyance direction with an image pickup axis of the second image pickup device interposed between the light emission devices, and
the second light emission device includes at least two light emission devices disposed to be spaced apart from each other in the conveyance direction with an image pickup axis of the first image pickup device interposed between the light emission devices.

6. The inspection apparatus according to claim 1, wherein
the first light emission device includes at least two light emission devices disposed to be spaced apart from each other in the conveyance direction with an image pickup axis of the second image pickup device interposed between the light emission devices, and
the second light emission device includes at least two light emission devices disposed to be spaced apart from each other in the conveyance direction with an image pickup axis of the first image pickup device interposed between the light emission devices.

7. The inspection apparatus according to claim 2, wherein
the first light emission device includes at least two light emission devices disposed to be spaced apart from each other in the conveyance direction with an image pickup axis of the second image pickup device interposed between the light emission devices, and
the second light emission device includes at least two light emission devices disposed to be spaced apart from each other in the conveyance direction with an image pickup axis of the first image pickup device interposed between the light emission devices.

8. The inspection apparatus according to claim 3, wherein
the first light emission device includes at least two light emission devices disposed to be spaced apart from each other in the conveyance direction with an image pickup axis of the second image pickup device interposed between the light emission devices, and
the second light emission device includes at least two light emission devices disposed to be spaced apart from each other in the conveyance direction with an image pickup axis of the first image pickup device interposed between the light emission devices.

9. The inspection apparatus according to claim 1, wherein
each of the first image pickup device and the second image pickup device includes a line camera using a one-dimensional element in which pixels are arranged one-dimensionally on a light receiving surface of the image pickup element.

\* \* \* \* \*